April 10, 1951 M. STERN 2,548,131
CONVEYER APPARATUS FOR SERVING OF MEALS
Filed April 7, 1948 8 Sheets-Sheet 1

INVENTOR:
Maurice Stern
By: John Graham
His Agent

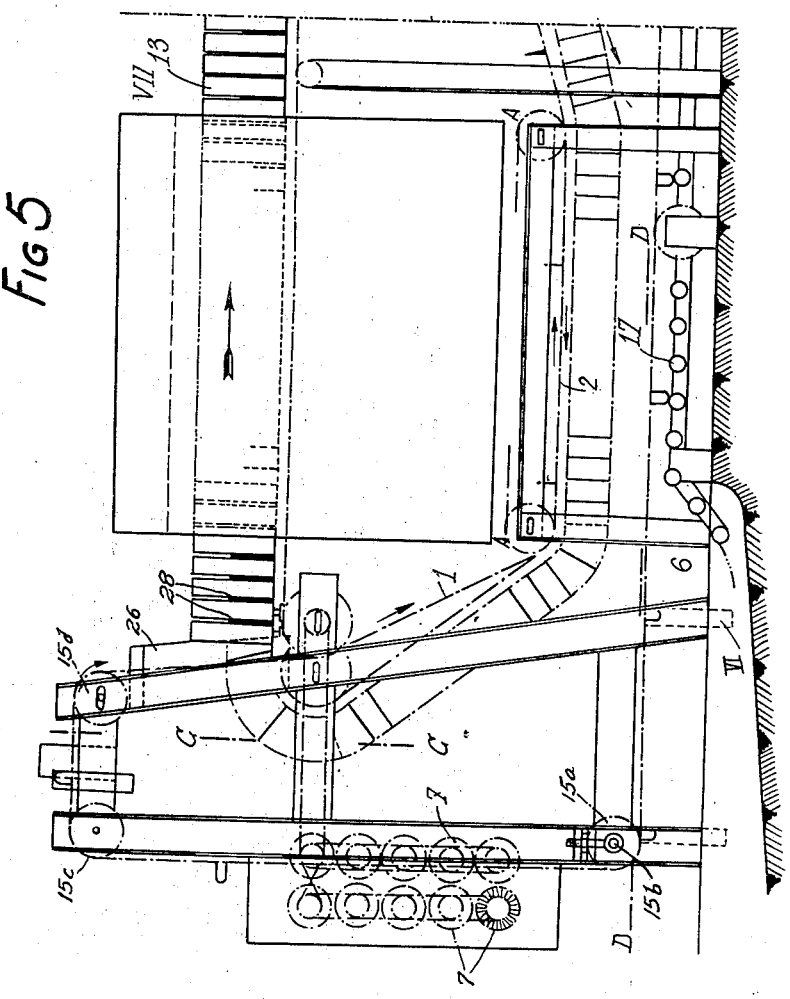

April 10, 1951   M. STERN   2,548,131
CONVEYER APPARATUS FOR SERVING OF MEALS
Filed April 7, 1948   8 Sheets-Sheet 3
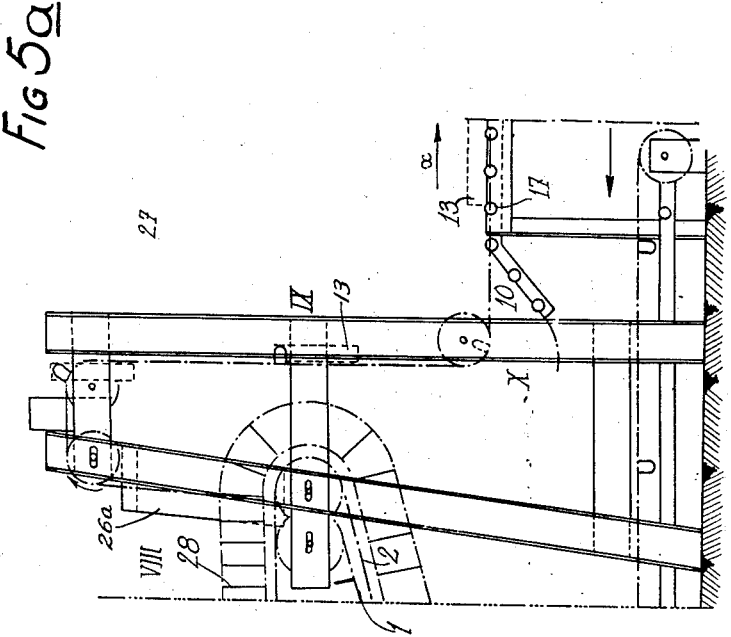
INVENTOR:
Maurice Stern
By: John W Graham
His Agent

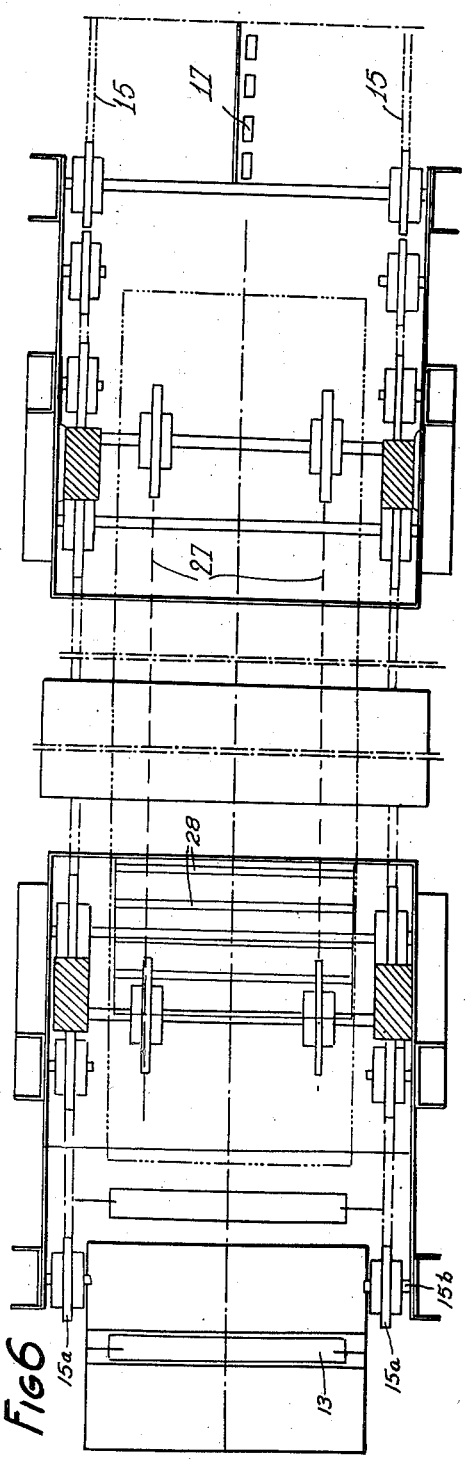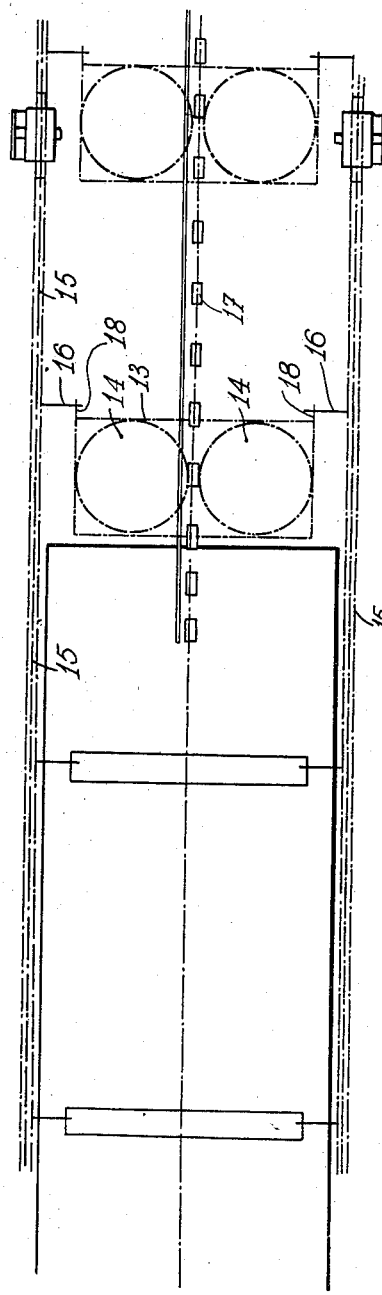

April 10, 1951     M. STERN     2,548,131
CONVEYER APPARATUS FOR SERVING OF MEALS
Filed April 7, 1948     8 Sheets-Sheet 5
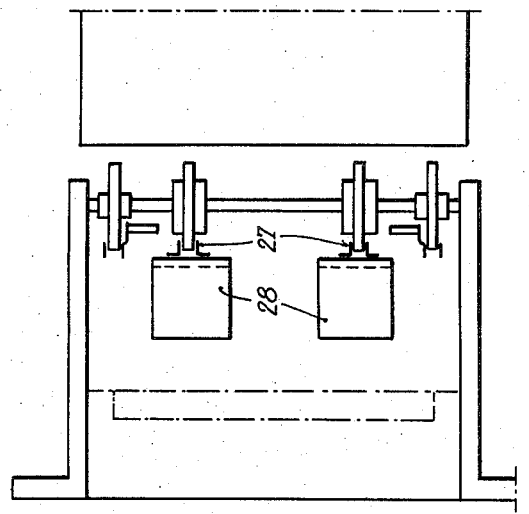
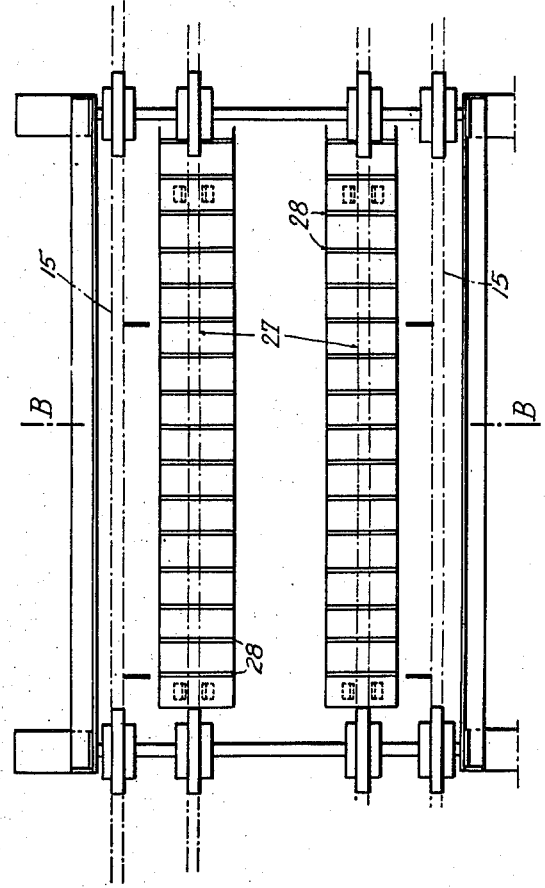
INVENTOR:
Maurice Stern
By: [signature]
His Agent April 10, 1951 M. STERN 2,548,131
CONVEYER APPARATUS FOR SERVING OF MEALS
Filed April 7, 1948 8 Sheets-Sheet 6

INVENTOR:
Maurice Stern

By: John M Graham

His Agent

INVENTOR:
Maurice Stern

By: *John H Graham*

His Agent

Patented Apr. 10, 1951

2,548,131

UNITED STATES PATENT OFFICE 2,548,131

CONVEYER APPARATUS FOR SERVING OF MEALS

Maurice Stern, New York, N. Y., assignor to Mecres, S. A., Panama, Panama, a corporation of Panama Application April 7, 1948, Serial No. 19,463

5 Claims. (Cl. 198—20)

This invention relates to new and useful apparatus for the automatic service of meals.

Heretofore, proposals of various types have been made whereby a large number of people may be fed at one time with some degree of automatic functions but such prior proposals have at best been only partly successful in the general approach to automatic supplying of food.

One of the greatest advantages to be gleaned from automatic service of meals is the saving of labor and coupling this with the advantages of sanitary handling of the food, speed of service, and equivalent results, any means to achieve substantially complete automatic service becomes of definite benefit to the public.

It is generally the object of the present invention, therefore, to provide new and useful apparatus for service of meals to a plurality of consumer stations in a manner which is substantially completely automatic.

Other specific objects will be pointed out hereinafter, or will be obvious from the disclosure hereof.

Generally, the present invention relates to a machine which brings about a simplified installation for an automatic meal service. In practicing the invention, the machine provides two conveyors. The principal conveyor brings the filled dishes or plates to the diners, stops to give sufficient time for eating the meal from the plates thus served, then causes the clearing of the dishes, the removal of the waste and the scraping of the plates, and subsequently places the latter on the second or auxiliary conveyor, which passes through a washing machine and then to the drying zone. The plates are then taken up again by the first conveyor, which returns them to the kitchen for filling with food and places them again in front of the diners. In addition to the general characteristics the machine presents certain other features, particularly with respect to the passage of the plates after eating of the meal from the upper run to the lower run of the main conveyor, which transfer is effected while maintaining the horizontal position of the plates.

In more specific detail, the method employed in accordance with the present invention preferably comprises transferring a plurality of cleansed empty plates forming a series from a stacking zone to a supply zone in timed sequence whereby during the transfer the plates may be supplied with food; continuing said timed transfer to a table common to a plurality of consumer stations equal in number to the plurality of plates forming the series; stopping said transfer when the last plate supplied with food is before its consumer station; restarting said transfer of plates after consumption of the meal; transferring said plates to a station at which said plates are emptied and scraped free of waste; transferring said scraped plates to a station for pick-up and conveyance at a different speed; conveying said plates through a washing zone at a decreased speed; and conveying said washed plates to said stacking zone to be ultimately picked up and transferred to said supply zone.

The means or apparatus employed in the machine according to the present invention preferably comprises a serving conveyor comprising preferably a pair of endless chains; driving means for continuously moving said conveyor past a plurality of consumer stations; a plurality of baskets for supporting plates therein adapted to be releasably hung from said serving conveyor and moved to and past a plate filling zone to said consumer stations; means to start and stop said driving means; a second auxiliary conveyor driven at a speed of predetermined relation to that of said serving conveyor and comprising preferably a pair of endless chains and moving with a part thereof in proximity with said serving conveyor; transfer means for passing baskets sequentially from one of said conveyors to the other and vice versa; a washing machine into and through which said auxiliary conveyor passes carrying baskets containing soiled plates for washing; and a stacking mechanism for receiving said washed plates, said baskets being carried horizontally by said serving conveyor and vertically by said auxiliary conveyor and being transposed from horizontal to vertical by said transfer means.

The accompanying drawings forming part of this specification illustrate by way of example some embodiments of the present invention.

In the drawings:

Figures 5 and 5a are detailed elevational views of a portion of the machine built according to the view of Fig. 1.

Figure 6 is a plan view of the machine of Fig. 5.

Figure 7 is a horizontal section of the machine of Fig. 5 taken on line AA of Fig. 5.

Figure 8 is a transverse section of the view of Fig. 7 taken on line BB of Fig. 7.

Figure 12 is a horizontal section of the machine of Fig. 5 taken on line DD of Fig. 5 and refers to the lower run of the principal conveyor.

The method and machine according to the present invention has been designed so as to automatically ensure the following functions:

(1) Placing the various courses of a meal in front of the diners and leaving them there for a length of time necessary for eating the courses of the whole meal.

(2) Clearing the plates away after each serving of a course.

These two functions concern the part of the machine which is in the dining room proper.

(3) Cleaning the empty plates.

(4) Stacking the cleaned plates so as to dry them prior to a second use for another serving.

These latter two functions concern the kitchen side of the machine.

According to the invention and in order to accomplish the purpose defined hereinbefore the machine is construed essentially in the following manner:

The plates or other dishes are disposed in containers or metal baskets preferably made of unoxidizable metal or plastic. These baskets may be of rigid structure, laterally openable to permit the diner of taking his plate. Alternatively, they may be of the type with an upper removable flap. In the case of baskets having a lateral opening, the top of the basket must be provided with sufficiently large meshes to allow of filling the plates placed therein with food.

The connection of these baskets with the conveying devices securing their placement will be explained hereinafter.

Figure 1:
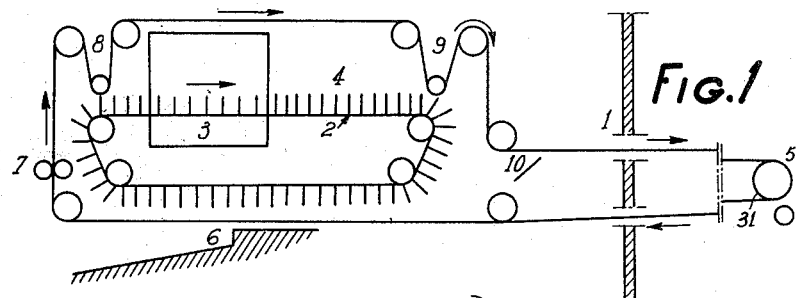
Figure 1 is a diagrammatic elevation of a complete machine according to the present invention.

Generally, in order to accomplish the four functions indicated hereinbefore, the machine according to the invention as shown in Fig. 1 comprises a principal conveyor 1 passing the baskets from the kitchen to the diner and back. Conveyor 1 travels on the level of the table in the forward direction and inside said table on a lower level in the return direction.

Auxiliary conveyor 2 carries the baskets into and through a washing machine 3 and into a stacking zone 4.

Principal conveyor 1 is combined with a descending device 5 at the dining room end of the table for displacing the baskets horizontally during their passage from the upper run to the lower run of the principal conveyor 1. A tripping device 6 is provided at the lower run of the principal conveyor 1 to ensure the emptying of the plates at their return to the kitchen by tipping them from the horizontal position during movements on conveyor 1.

A preliminary cleaning device 7 for completing the operation begun by the tripper 6 is also provided.

Cooperating with conveyor 1 is a device 8 for placing the baskets successively upon the auxiliary conveyor 2 and releasing them thereupon and a device 9 for removing the baskets after cleaning and drying from the auxiliary conveyor 2 so that said baskets are again firmly attached only to the principal conveyor 1, and a device 10 which restores the horizontal position of the baskets on the upper run of the principal conveyor 1, which allows of filling the plates and passing them along to the dining table.

The auxiliary conveyor 2 is adapted to pass the baskets to the washing machine 3 and a part 4 of the upper run of conveyor 2 is outside the washing machine 3 and is used as a stacking device for the baskets, to permit their drying prior to the subsequent use.

The drive means of the two conveyors 1, 2 is preferably synchronized and from a single prime mover and the speed of travel of conveyor 1 may be ten times that of conveyor 2 for example.

Figure 2:
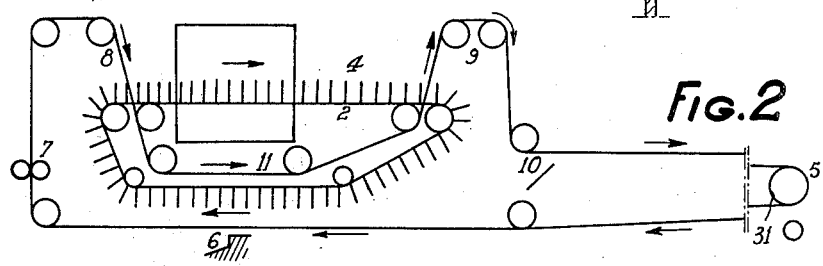
Figure 2 is a view similar to Fig. 1 of another embodiment of the invention.

In the embodiment of Figure 1 the principal conveyor 1 circulates round the auxiliary conveyor 2. This arrangement is, however, only given by way of example. In the diagram of Figure 2, for instance, the run 11 of the principal conveyor 1 travels on a plane above the lower run of the conveyor 2. In this case, the conveyors 1 and 2 cross each other and the conveyor 1 has necessarily a width different to that of the conveyor 2.

Figure 3:
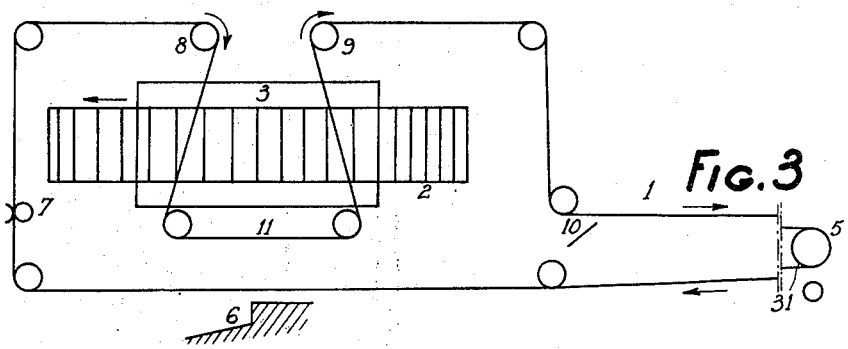
Figures 3 and 4 illustrate schematically in elevational and plan views, a third embodiment of the invention.
Figure 4:
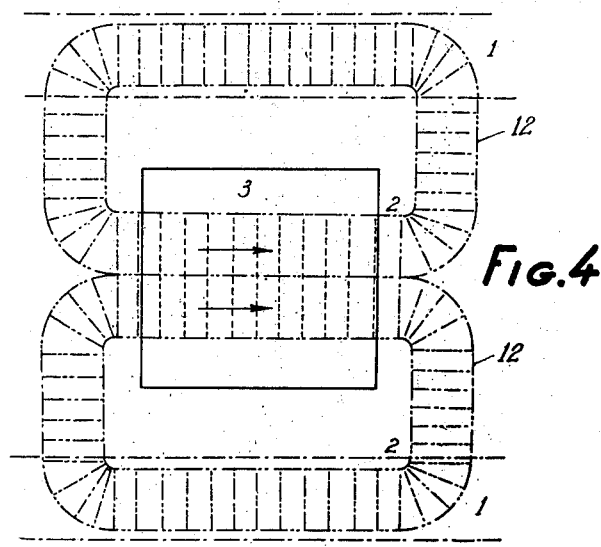

In the embodiment of Figures 3 and 4 the planes of the chains of the conveyor 2 are horizontal whereas those of the chains of the conveyor 1 remain vertical. This permits, on the one hand, to place the stacking zone on the return run 12 of the auxiliary conveyor 2, and on the other hand to utilize the same washing machine 3 for two principal conveyors 1 (shown in dotted lines along the upper and lower portions of Fig. 4) serving different tables.

In the following I shall describe the means to put into practice a machine designed according to the diagram of Figure 2. In this construction I have further assumed (by way of example) that each basket 13 (Figure 5) receives two plates 14 disposed side by side transversally with respect to the principal conveyor (see Fig. 12). In this way, the latter serves two dining tables which enclose it on the dining room side of the machine. If desired, the dining table or tables may be arranged also in such a way that the diner may eat his meal without removing the plate 14 from its basket on the conveyor. The principal conveyor 1 comprises a pair of parallel endless chains 15, preferably of the sprocket type. These chains 15 are synchronized and provided with fingers 16 engaging the regularly spaced baskets 13. This engagement is such that the fingers 16 may either push or pull the baskets 13 and also ensure their vertical suspension with the baskets 13 then hanging with respect to the chains 15 of the conveyor 1 as hereinafter brought out. During part of their travel the baskets 13 are supported when in their horizontal position by rollers 17 positioned in the plane of symmetry of the two chains 15 of the principal conveyor 1. These chains 15 pass over sprocket wheels ensuring their movement and guiding them in the changes of direction.

Figure 9:
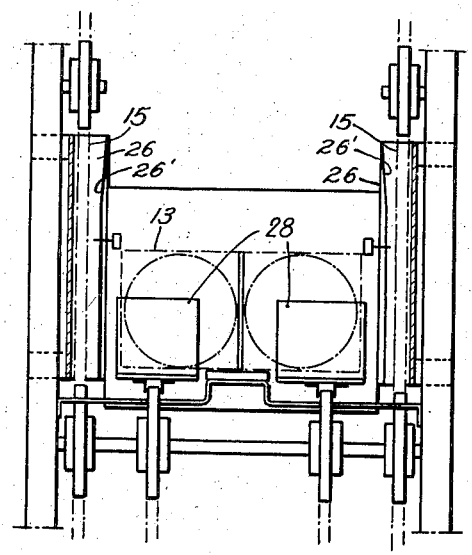
Figure 9 is a transverse section of the machine of Fig. 5 taken on line CC of Fig. 5.

The connection between the conveyor chains 15 and the basket 13 is by means of the following mechanism, which is applied identically to each of the ears 18 arranged symmetrically at each basket 13. Each ear 18 is provided (see Figs. 10, 11) with a horizontally mounted socket 19. The blind bore of the socket 19 is prolonged outwardly by two surfaces 20 forming an upper V-shaped member with a horizontal edge. The chains 15 of the conveyor 1 are correspondingly provided with vertical brackets 16 carrying a horizontal pin 21. Pin 21 is composed of two telescoping elements 22, 23, and an inner spring 24 tends to extend the pin 21 to its maximum length. Element 22 is integral with the bracket 16 carried by the chain 15, whereas the other element 23 may enter with a slight play into the bore provided in the socket 19 of the basket ear 18 which is of larger diameter than that of the element 23. On this same element 23 are mounted the diametrically opposite shafts 24' for two rollers 25. At the region indicated at 8 in Fig. 2, cam-like elements or guide-ways 26 (see Figs. 9 and 10) are mounted to extend along the conveyor chains and to engage the rollers 25 in such a way as to cause the elements 23 to be released from the sockets 19 to permit the baskets 13 to be transferred from conveyor 1 to conveyor 2. Vertical sectional views of the guide-ways 26 are shown in Fig. 9 adjacent each of the conveyor chains 15, whereas in Fig. 10 a top view of one of the guide-ways 26 is shown. As the baskets are brought downwardly on the conveyor 1 past the position 8 shown in Fig. 2, the two opposed flanges as shown on each of the rollers 25, become positioned astride the inclined surface portions 26' of the guide-ways 26 so that the shafts 24' are moved toward the right in Fig. 10, and consequently the element 23 is drawn out of the socket 19 against the pressure of spring 24, thereby unlocking the basket from the conveyor. Although the basket becomes unlocked from the conveyor, it will remain suspended temporarily on the pin element 23 due to the supporting V-shaped member 20, until such time as the conveyor 2 carries away the basket in a manner hereinafter described. As is also later described, guide-ways similar to those at 26 are positioned adjacent the station indicated at 9 in Fig. 2 for controlling the operation of the pin element 23 at the point where the baskets are to be taken from the conveyor 2 and again locked onto the conveyor 1.

Auxiliary conveyor 2 is composed of two sprocket chains, shown at 27 (see Figs. 6, 7 and 8). Chains 27 carry frames 28 forming partitions for the stacking of baskets 13 therewithin as shown hereinafter.

Chains 27 of the auxiliary conveyor 2 are guided by suitable sprocket wheels, and a power connection (not shown) is provided between the drive pulley of the auxiliary conveyor 2 and that of the principal conveyor 1 whereby a convenient travelling speed ratio of the two conveyors is attained.

Figure 13:
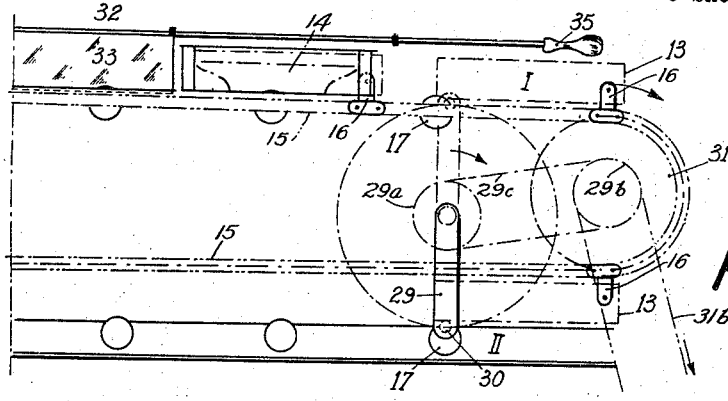
Figures 13, 14 and 15 are views in elevation, transverse half-section and plan view of the dining room and of the principal conveyor.

Assuming that a serving has been supplied to the diners and eaten, the baskets 13 receive the empty plates from the diners. The principal conveyor 1 is then set in motion for clearing away the plates and the baskets 13 are carried away from the diners by the conveyor chains 15, while riding on the rollers 17 (see Figs. 13, 14 and 15). When they come to the far end of the principal conveyor 1 the baskets 13 are subjected to a vertical bodily displacement to pass them to the lower run of said conveyor. This descent is carried out while preserving the horizontal position of the baskets 13 by means of the device at 5 (Fig. 2). To this end, the device 5 (Figs. 13, 14, 15), comprises cranks 29 receiving their rotating movement from (through pulleys 29a, 29b and belt 29c) from the same power source as the wheels 31 which drive the chains 15 of the principal conveyor 1, viz. from a prime mover 31a through suitable connections shown dotted at 31b. Cranks 29 are provided at their free ends with crank pins 30. Pins 30 are mounted in such a way that in their diametrically opposite positions they may each engage under the bottom of the baskets 13 (Fig. 13). In addition these cranks 29 may perform lateral movements which displace them parallel to each other longitudinally of their axes of rotation. Accordingly, the pins 30 can each engage under the bottom of the baskets 13 or disengage to release the latter. These translations may be controlled by any suitable simple form of cam means located adjacent the axes of rotation of the cranks 29. For example as somewhat schematically indicated in Fig. 14, the cranks 29 may be fixed to shafts as at 29' splined to permit longitudinal movement within the hubs of pulleys 29a. The outer ends of each shaft 31 may have a smaller extension portion surrounded by a coil spring as at 30a and terminating in cam means at 30b for engaging suitable stationary cam means at 30c during portions of each revolution, and so that during one half of each revolution of the cranks 29, they will be thrust to the dotted line positions as shown at III in Fig. 14, and during the other half of each revolution, they will be retracted to the full line positions as shown at IV in this figure. The rotary and translatory motions of the cranks 29 are thus combined in such a way that when a basket 13 reaches the position (I) (Fig. 13), the crank pin 30 supports the bottom of the basket 13 to effect the vertical travelling bodily thereof. In this position the track-support of the baskets represented by the rollers 17 is interrupted. The basket 13 passes horizontally by a vertical translation from the upper run to the lower run of the principal conveyor 1 by means of the rotation of the cranks 29 which support one end of each basket while the fingers 16 on the conveyor chains as they pass over the driving wheels 31 support the other end of the basket.

Figure 14:
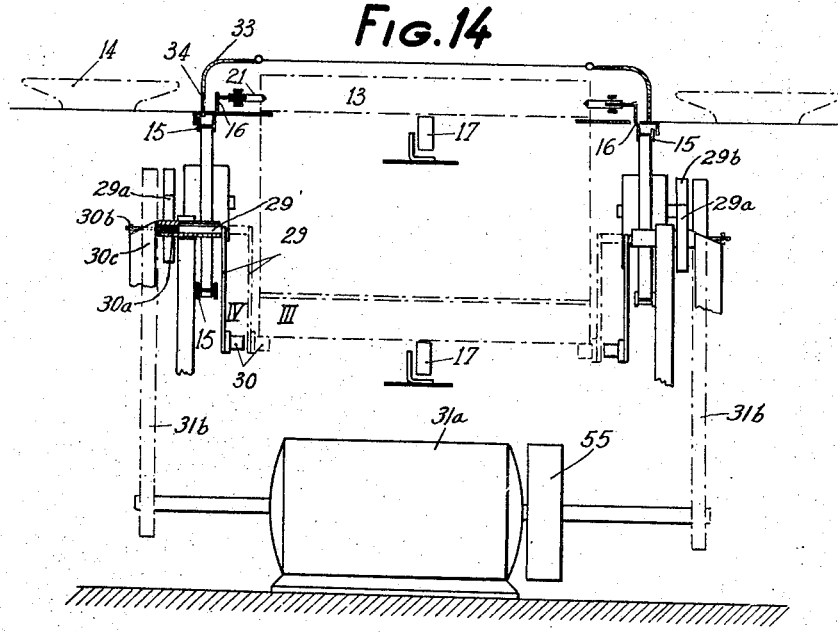
Figure 15:
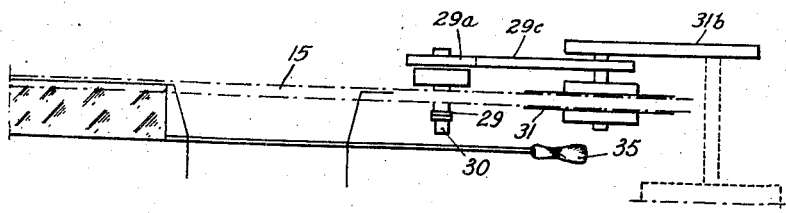

When the crank pin 30 reaches the position II (Fig. 13), it is disengaged by displacement of the crank which passes from the position III to the position IV (see Fig. 13 and Fig. 14). The basket 13 thus cleared of its descending support is again maintained in a substantially horizontal position by the lower track of the supporting rollers 17.

The baskets 13 continue their travel on the lower run of the chains 15 of the principal conveyor 1 until they come to the tripping station at 6 (Figs. 1, 2, 3 and 5). The object here is to dump from the baskets 13 the waste which the plates may contain. To that end the roller track 17 curves downwardly (Fig. 5) to allow the baskets 13 to pivot about the pins 21 which attach them to the driving chains 15 until they assume a vertical position and are freely suspended (position VI).

Subsequently the chains 15 of conveyor 1 are vertically deflected by sprocket wheels 15a mounted on pivots 15b. The baskets 13 are now suspended parallel to these chains 15 which pass them between two sets of rotating brushes 7; here the baskets 13 and plates enclosed therein are thoroughly scraped. The baskets 13 still suspended with respect to the conveyor 1 are first horizontally displaced and then subjected to an inclined descent by suitable sprocket wheels 15c and 15d, during which they pass from the principal conveyor 1 to the auxiliary conveyor 2. The baskets 13 thus descending are successively caught between a pair of the frames 28 carried by the chains 27 of the auxiliary conveyor 2 as shown in Fig. 7. It is obvious that this operation necessitates at a given moment disconnecting the baskets 13 from the principal conveyor 1 so that the baskets 13 take part only of the movement of the auxiliary conveyor 2. This unhooking operation is carried out in four steps:

(1) Unlocking the basket 13
(2) Engaging the auxiliary conveyor 2
(3) Locking onto the conveyor 2
(4) Releasing the principal conveyor 1.

Figure 11:
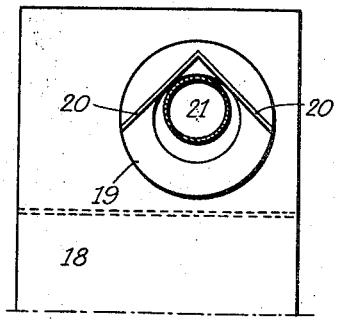
Figures 10, 11 and 11a are views of details and on an enlarged scale in transverse section and side view of the mechanism which permits of connecting and disconnecting the various containers or baskets for the plates with the chains of the principal conveyor.
Figure 11A:
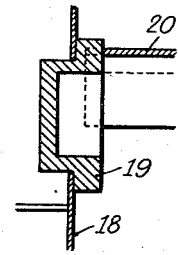
Figure 10:
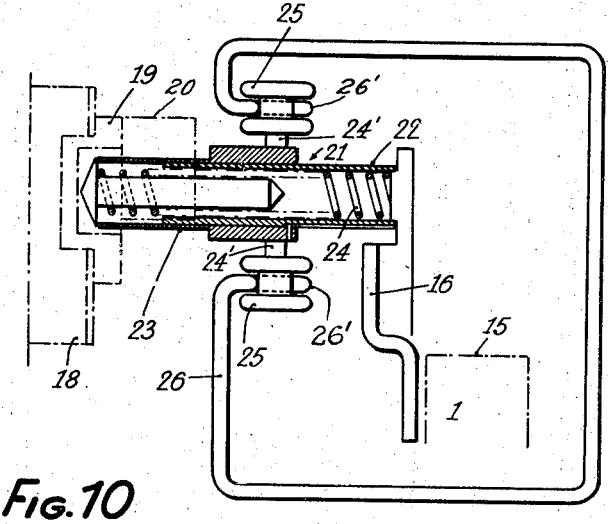

The unlocking results from an engagement of the rollers 25 of the pins 21 with cam tracks 26 as shown in Figs. 9, 10, withdrawing the outer element 23 of the telescoping pins 21 from the corresponding socket 19 of the basket 13. As already indicated, the basket 13 remains suspended on the outer element 23 of the telescoping pins 21 by its V-shaped member 20, then located around said pins 21 (Fig. 11). If the basket 13 is now stopped by contact of its bottom with a stopping means (i. e., the conveyor 2) the principal conveyor 1 continues its travel and no longer sustains the baskets by their ears and by means of the V-shaped member 20, so that the disengagement from the suspension pins 21 results automatically.

The lodging of the basket 13 between a pair of the partitions 28 of the auxiliary conveyor 2 is obtained without difficulty because the run of the conveyor 1 is so arranged that the horizontal component of movement of the basket 13 during the unhooking is, because of the inclined position of conveyor 1, equal to the horizontal speed of the auxiliary conveyor 2. The entry of a basket 13 between partitions of the conveyor 2 is assisted by the fact that the basket 13 begins engaging the auxiliary conveyor 2 in the curved part of the latter where the frames 28 diverge as is clearly shown in Fig. 5. The locking onto the auxiliary conveyor 2 is, therefore, automatically obtained by the closing of these frames 28 caused by the partial rotation around the sprocket wheel of conveyor 2.

The complete release from the principal conveyor 1 is also obtained without difficulty because, when the basket 13 rests on the auxiliary conveyor 2, the pin 21 continues its downward travel and consequently leaves the V-shaped member 20. After the pins 21 pass the cam tracks 23 (Fig. 9) they will revert to their extended position as in Fig. 10.

The auxiliary conveyor 2 passes through a washing machine 3 of known form which may be of the continuous type performing, for instance, the three following washing steps: prewashing, washing and rinsing. These three operations correspond to three distinct sections inside the machine 3 and will be automatically performed during the travel of the auxiliary conveyor 2 through said machine. The washing mechanism will be put in action at the same time that the machine according to this invention is set in motion by any conventional means.

It will be apparent that the baskets in travelling through the washing machine will be retained in generally upright positions so that the plates etc. will be held therein in positions for efficient washing, the washing water and waste material being free to drain off therefrom vertically. Also, since the baskets in the washing machine are in a position with their longer dimension extending vertically, they may be much more closely spaced than when on the serving conveyor. Thus a larger number of the baskets may be concurrently and more efficiently washed in the washing machine than would be the case if the baskets were not transferred into a vertical closely spaced position as compared with the more widely spaced horizontal positions of the baskets on the serving conveyor. And to insure that the baskets remain in the washing machine for a sufficient interval to permit thorough washing, the auxiliary conveyor, as above indicated, runs much slower than the serving conveyor, it being desirable to bring the baskets from the filling station out to the customer stations quite rapidly, and with the customer positions much more widely spaced than the possible spacing of the baskets in the washing machine. From Figs. 5 and 5a it will be apparent that the ratio of the spacings of the baskets on the two conveyors will be equal to the ratio of the velocities of the conveyors, i. e., $$\frac{l}{L}=\frac{v}{V}$$

where l is equal to the spacing of the baskets (in vertical positions) on the auxiliary conveyor; L is equal to the spacing of the baskets (in horizontal positions) on the serving conveyor; $v$ is equal to the speed of the auxiliary conveyor; and V is equal to the speed of the serving conveyor.

After leaving the washing machine 3 the frames 28 of the auxiliary conveyor 2 form stacking compartments for baskets 13 in stacking zone 4 which is reserved for the drying of the cleaned plates 14 in baskets 13—the series of baskets 13 shown in VII (Fig. 5) represents a complete series of baskets 13 corresponding to the complete service of a course by the machine to the consumer stations. The empty space (VIII) (Fig. 5a) corresponds to the necessary interval between two consecutive series of baskets.

When the baskets 13 are to be distributed from the stacking zone 4, the movement of the auxiliary conveyor 2 must carry them to the adjacent upwardly directive run of the principal conveyor 1 which is, as shown, slightly inclined as at the entry of said auxiliary conveyor 2. The mechanism described for passing the baskets 13 from the auxiliary conveyor 2 to the principal conveyor 1 is identical to that already set forth, but it works inversely, the baskets 13 being this time caught by the principal conveyor 1. That is, as will be readily understood, cam tracks are positioned at 26a (Fig. 5a) alongside the conveyor chains, similar to the cam tracks 26 of Fig. 9, but with inclined surfaces so shaped and positioned that as the pins 21 on the conveyor are elevated, the pin portions 23 will first be retracted and then allowed to protrude at the proper time into the sockets 19 on the basket ears as the baskets respectively come into position ready to be taken from the conveyor 2. After having been hooked upon conveyor 1, the baskets 13 travel vertically in the zone (IX) to the position (X) where they come in contact with the roller-ramp 10. In its translational movement the principal conveyor will restore the baskets 13 to the horizontal position and the plates will be filled by the server in the kitchen while they move forward on the conveyor past the server to be carried then towards and into the dining room proper.

In order to permit the patron access to the conveyor only at the time chosen by the dining room superintendent, a guard device 32 (Fig. 13) may be provided. Guard 32 comprises a frame-work 33 having a plurality of lateral openings at 34 permitting access to the conveyor 1. These openings 34 may be closed by sliding doors controlled simultaneously by the superintendent, for instance, by means of a handle 35 or any other equivalent means.

To ensure the operation of the machine a prime mover such as an electric motor 31a with a fly wheel and speed reducer 55 is used (Fig. 14).

The speed of rotation will be calculated in relation to the installation so that the acceleration and deceleration in starting and stopping are less than one foot per second, in order to avoid spilling of liquids which may be carried in the filled plates.

Figure 16:
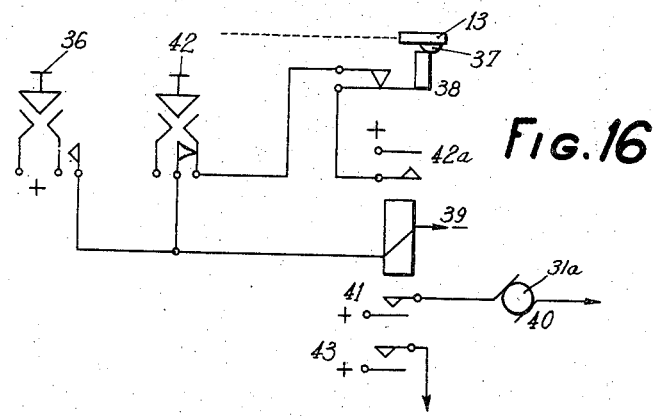
Figure 16 is a diagram of the electric system controlling the operation of the machine.

The apparatus is so controlled as to limit the manual operations to the filling of the plates 14 in baskets 13 and to initially set the machine in motion. To start the machine an electric installation as shown in Fig. 16 may be used. The operation is as follows: a light signal circuit (not shown) allows the dining room superintendent to inform the kitchen by turning on a light that the service is requested. The kitchen superintendent turns off the light when he is ready. At this time the dining room superintendent starts the machine by pushing a button 36 to energize the windings 40 of the driving motor 31a. That is, by pushing the button 36 the operator closes the relay 39, and the motor circuit 40 is established by the contact 41. The conveyor 1 now starts to move.

The first basket 13 of each series constituting the service for the desired consumer stations is provided with a supplementary projection or boss 37 adapted to act on a switch 38 located at the kitchen-end of the table. When the first basket has released the circuit-breaking lever of the switch 38, the relay 39 is maintained in self-excitation by its contact 42a. At this time the dining room superintendent may stop pushing the button 36 since the motor circuit 40 remains closed until the arrival of the first basket of the following series, which will in its turn act by its boss 37 upon the contact 38 and consequently open the self-exciting circuit of the relay 39 and the motor circuit 40 to stop the movements. The conveyor 1 will then gradually come to a stop due to the action of the fly wheel 55 keyed to the motor 31a. Switches 42 and 42a permit stopping the motor 31a at any moment. The relay 39 may also control the water distribution to the washing machine through a switch 43 if desired.

The foregoing description relates to a machine and method of operation, the assembled mechanism of which follows a uniform symmetric design, but it is by no means necessary to limit the use of this machine to a rectilinear arrangement, as is obvious.

Figure 17:
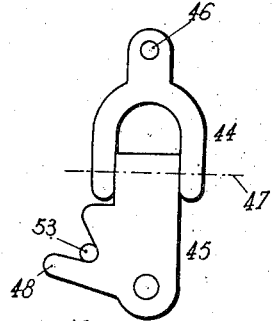
Figures 17 and 18 are elevational and side views of another form of a device for connecting the baskets containing the plates with the principal conveyor.
Figure 18:
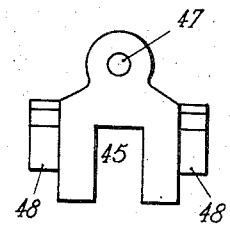

It is possible to apply the devices here described to unsymmetrical installations. The principal conveyor 1' is then composed of a central chain with links as at 44—45 having two degrees of freedom, of the kind shown by the Figures 17, 18 and 19 where the links are connected on axes 46—47 perpendicular to each other and carry lateral hooking fingers 48.

In this arrangement the double basket is formed by two distinct baskets 13 joined together by a hooking pin.

These baskets 13, laterally guided by appropriate means, are carried by the central chain of which the fingers 48 will be in contact with the pin 53 between coupled basket 13.

Figure 19:
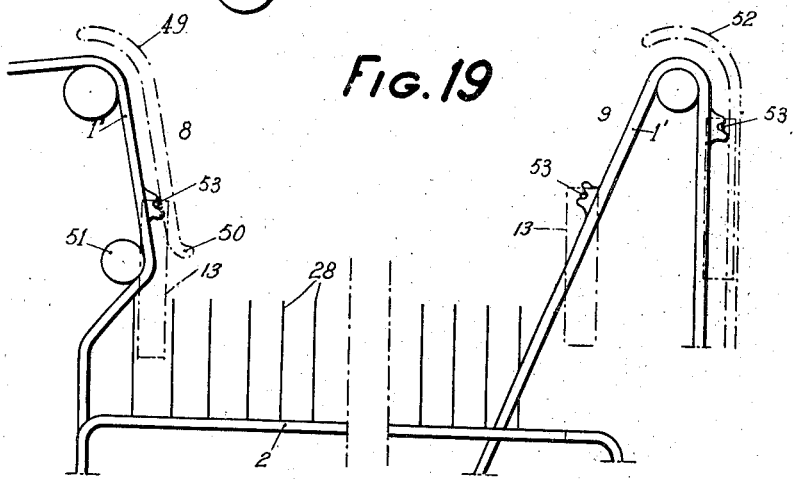
Figure 19 shows means adapted to deliver the baskets to the auxiliary conveyor and to remove them again therefrom.

The change from one level to the other at the end of the table is obtained by means of an elevator of the kind indicated hereinbefore such as device 5, Figs. 1, 2, and 3. A retention ramp 49 of convenient form maintains the pins 53 and fingers 48 in contact as shown in Figure 19.

The return to the kitchen is carried out by operations analogous to those controlling the transport to the dining room while using such curved forms as imposed by the room disposition or lay-out of the machine.

The tripping and pre-cleaning operations are analogous to those already described herein.

The auxiliary conveyor 2, the washing machine 3 and the stacking being of the kind previously described, the transfer from the principal conveyor 1' to the auxiliary conveyor 2 (and vice versa) may be carried out as follows: the baskets to be washed are engaged upon the auxiliary conveyor 2 in a manner analogous to that herein described before. However, it may be noted that the locking of the baskets 13 upon the principal conveyor 1' is ensured by a fixed ramp 49 which is parallel to the run 8 of the chain of the principal conveyor 1'. At 50, where the engagement of the basket 13 between the frames 28 of the auxiliary conveyor 2 is sufficiently advanced, the locking ramp 49 is interrupted. The basket 13 slides into the space between these frames 28 while completely releasing the movable pin, which can then be withdrawn by a rotary motion of conveyor 1' around the horizontally mounted wheel 51 to pass below the washing machine and reappear at the other end of the auxiliary conveyor 2 for taking charge symmetrically of the double basket 13 in its median plane. The basket 13 is again locked to the principal conveyor 1 by means of the fixed ramp 52. The righting operation is performed in the same manner as previously described.

What I claim is:

1. In apparatus for conveying plates in baskets to and from a plurality of meal serving stations and for subsequently conveying the baskets containing the plates at a slower speed on an auxiliary conveyor through a washing machine, the combination comprising a first endless chain conveyor, driving means for moving said conveyor past said stations, a plurality of baskets having releasable connections for securing same on said conveyor in spaced relation for movement to and from said stations, control means to start and stop said drive means, an auxiliary conveyor means having drive means for driving same at a speed slower than said first conveyor, said auxiliary conveyor being constructed and arranged to pass two spaced positions, and said first conveyor having downwardly and upwardly running stretches which respectively pass in close proximity to said positions in succession, means for causing the passing of the baskets sequentially from said first conveyor to said auxiliary conveyor at the first of said positions, and other means for effecting return of said baskets to the first conveyor at the second of said positions, said downwardly and upwardly running stretches also having horizontal components of motion in the direction of and corresponding to the auxiliary conveyor motion at said two positions.

2. In apparatus for conveying dishes in baskets to and from a plurality of meal serving stations and for subsequently conveying the baskets containing the dishes on an auxiliary conveyor through a washing machine, the combination comprising a first endless flexible conveyor, driving means for moving said first conveyor along a path to and from said stations, a plurality of baskets having releasable connections for securing same at spaced points along said first conveyor, said connections comprising retractable trunnion-like devices, an auxiliary conveyor which crosses the path of said first conveyor at two transfer points and members fixed adjacent each of said transfer points for operatively engaging and retracting said trunnion-like devices at predetermined times whereby the baskets are released from the first conveyor onto the auxiliary conveyor and at the second transfer point are reconnected to the first conveyor and thereby transferred thereto from the auxiliary conveyor.

3. In apparatus for conveying dishes in receptacles to and from a plurality of meal serving stations, also past cleaning stations and on an auxiliary conveyor through a washing machine, the combination comprising an endless flexible first conveyor, means for driving and guiding the travel of said conveyor along an endless circuitous path past said first named stations, a plurality of the receptacles each having trunnion-like connections adjacent one end for securing same at spaced points along said conveyor, guiding means along said conveyor acting in conjunction with said connections to retain said receptacles in generally horizontal positions during passage thereof past said first named stations, subsequent portions of said conveyor including an upwardly running stretch followed by a downwardly running stretch on which stretches the receptacles are free to pivot to generally vertical positions, an auxiliary conveyor, means including devices acting to release said trunnion-like connections for releasing the vertically positioned baskets onto said auxiliary conveyor at one position on the latter, and means including devices acting to re-engage said trunnion-like connections with the receptacles at a subsequent point to reconnect said receptacles back onto the first conveyor.

4. Conveying apparatus comprising in combination first and second endless flexible conveyor elements, a plurality of receptacles each having a normally horizontal dimension substantially greater than its vertical dimension, detachable trunnion-like connections for securing each of said receptacles adjacent one end thereof to said first conveyor element at spaced points therealong, guiding means along said first conveyor element acting in conjunction with said connections to retain said receptacles in generally horizontal position during the passage thereof past successive stations, the receptacles thereafter being free to swing on said connections to vertical positions, said second conveyor element being positioned to carry said receptacles thereon in closely spaced vertical positions from one point on said first conveyor element to another point thereon, means acting to retract said trunnion-like connections at the first of said points for releasing said receptacles from substantially vertical positions on said first conveyor element sequentially onto said second conveyor element, further means acting to re-engage said trunnion-like connections at said other point with said receptacles for connecting same sequentially in substantially vertical positions back onto said first conveyor element, and power means for driving said conveyor elements respectively at different speeds, the ratio of which speeds equals the ratio of the spacings of said receptacles on said conveyor elements respectively.

5. Conveying apparatus comprising in combination first and second power driven endless flexible conveyor elements, a plurality of receptacles, detachable trunnion-like connections for securing each of said receptacles adjacent one end thereof to said first conveyor element at spaced points therealong, guiding means along said first conveyor element acting in conjunction with said connections to bring said receptacles in generally horizontal position for passage past successive stations, the receptacles thereafter being free to swing on said connections to vertical positions for passage past other stations, said second conveyor element being positioned to carry said receptacles thereon in closely spaced vertical positions from one point on said first conveyor element to another point thereon, means acting to retract said trunnion-like connections at the first of said points for releasing said receptacles from substantially vertical positions on said first conveyor element sequentially onto said second conveyor element, and further means acting to re-engage said trunnion-like connections at said other point with said receptacles for connecting same sequentially in substantially vertical positions back onto said first conveyor element.

MAURICE STERN.

REFERENCES CITED

The following references are of record in the file of this patent:

UNITED STATES PATENTS

| Number | Name | Date |
|---|---|---|
| 695,400 | Knott | Mar. 11, 1902 |
| 1,031,186 | La Place | July 2, 1912 |
| 1,128,448 | Hitchcock | Feb. 16, 1915 |
| 1,820,564 | Hall | Aug. 24, 1931 |
| 1,865,596 | Starks | July 5, 1932 |
| 1,881,898 | Olson | Oct. 11, 1932 |
| 2,280,221 | Dambach, Jr. | Apr. 21, 1942 |
| 2,335,790 | Ransburg | Nov. 30, 1943 |
| 2,470,311 | Holyer et al. | May 17, 1949 |